US012667901B2

(12) United States Patent
Hoshino et al.

(10) Patent No.: US 12,667,901 B2
(45) Date of Patent: Jun. 30, 2026

(54) HEAT TREATMENT FURNACE APPARATUS

(71) Applicant: Niterra Materials Co., Ltd., Yokohama (JP)

(72) Inventors: Masanori Hoshino, Yokohama (JP); Hiromasa Kato, Nagareyama (JP); Hideki Sato, Yokohama (JP)

(73) Assignee: Niterra Materials Co., Ltd., Yokohama (JP)

( * ) Notice: Subject to any disclaimer, the term of this patent is extended or adjusted under 35 U.S.C. 154(b) by 0 days.

(21) Appl. No.: 18/973,520

(22) Filed: Dec. 9, 2024

(65) Prior Publication Data

US 2025/0100059 A1 Mar. 27, 2025

Related U.S. Application Data

(63) Continuation of application No. PCT/JP2024/017939, filed on May 15, 2024.

(30) Foreign Application Priority Data

May 19, 2023 (JP) ................................. 2023-082844

(51) Int. Cl.
  B23K 3/08 (2006.01)
  B23K 3/04 (2006.01)
  B23K 103/18 (2006.01)
(52) U.S. Cl.
  CPC .................. B23K 3/08 (2013.01); B23K 3/04 (2013.01); *B23K 2103/18* (2018.08)
(58) Field of Classification Search
  None
  See application file for complete search history.

(56) References Cited

U.S. PATENT DOCUMENTS 8,662,888 B2 * 3/2014 Moller ...................... F27B 5/04
                                                      432/239
9,716,021 B2 * 7/2017 Kikuchi ............ H01L 21/67109
                            (Continued)

FOREIGN PATENT DOCUMENTS

JP      H09-150261 A    6/1997
JP      2001-074378 A   3/2001
                (Continued)

OTHER PUBLICATIONS

International Search Report and Written Opinion (Application No. PCT/JP2024/017939) dated Jul. 2, 2024 (8 pages).

*Primary Examiner* — Devang R Patel
(74) *Attorney, Agent, or Firm* — Muncy, Geissler, Olds & Lowe, P.C.

(57) ABSTRACT

A heat treatment furnace apparatus according to an embodiment heats, when a metal plate is brazed to a ceramic substrate, at least one storage container made of stainless steel, in which a plurality of ceramic metal substrates are stored, to subject the plurality of ceramic metal substrates to a heat treatment at 600 degrees Celsius or more and less than 950 degrees Celsius. The heat treatment furnace apparatus includes: a heater provided outside a furnace body; a rail section that transports the storage container placed inside the furnace body; and a transport device that transports the storage container placed on the rail section in a predetermined transport direction along the rail section while moving the storage container in a direction perpendicular to the rail section.

7 Claims, 14 Drawing Sheets

(56)          References Cited

U.S. PATENT DOCUMENTS

2009/0260401 A1* 10/2009 Shin ...................... C03B 37/029
                                              65/435
2021/0398928 A1   12/2021 Yonetsu et al.
2024/0034571 A1*  2/2024 Depner ............. B65G 47/5113

FOREIGN PATENT DOCUMENTS

| JP | 2003-214773 | A  |   | 7/2003  |             |          |
|----|-------------|----|---|---------|-------------|----------|
| JP | 2008008614  | A  | * | 1/2008  |             |          |
| JP | 4179714     | B2 |   | 11/2008 |             |          |
| JP | 2010054157  | A  | * | 3/2010  | ............ | H05B 3/20 |
| JP | 6986181     | B1 | * | 12/2021 |             |          |
| JP | 7240511     | B2 |   | 3/2023  |             |          |

* cited by examiner

HEAT TREATMENT FURNACE APPARATUS

CROSS-REFERENCE TO RELATED APPLICATION

This application is a Continuation Application of No. PCT/JP2024/017939, filed on May 15, 2024, and the PCT application is based upon and claims the benefit of priority from Japanese Patent Application No. 2023-082844, filed on May 19, 2023, the entire contents of which are incorporated herein by reference.

FIELD

Embodiments relate to a heat treatment furnace apparatus that performs heat treatment such as brazing on a ceramic substrate and a metal plate transported inside a furnace.

BACKGROUND

A method for manufacturing a ceramic metal substrate is to print and dry a paste (e.g., brazing material) containing metals such as silver, copper, and active metals on a ceramic substrate, place a metal plate on a surface of the dried brazing material, and perform heat treatment to join the ceramic substrate and the metal plate (Patent Document 1: Japanese Patent No. 7240511). Hereinafter, for convenience, a ceramic substrate, a brazing material, and a metal plate before joining, as well as a ceramic substrate, a brazing material, and a metal plate after joining each will be referred to as a "ceramic metal substrate". According to Patent Document 1, a metal plate is joined by heating at a temperature of 700 degrees Celsius to 950 degrees Celsius for 10 minutes or more under a reduced pressure of $10^{-3}$ Pa or less.

In addition, a mesh belt conveyor type brazing furnace has been disclosed in which a base material and a brazing material are transported inside the furnace by a mesh belt conveyor, and the brazing material is melted inside a heating chamber to perform brazing (Patent Document 2: Japanese Patent Laid-Open No. 9-150261). According to Patent Document 2, a mesh belt of the mesh belt conveyor is supported by a hearth roll in an in-furnace transport section on the furnace inlet side of a melting zone where the brazing material in the heating chamber melts, thereby reducing the frictional resistance applied to the mesh belt.

A method has been disclosed for moving a storage container for ceramic inside a heating furnace so that the container does not touch a surface (Patent Document 3: Japanese Patent No. 4179714). According to Patent Document 3, a rail section for transporting a work storage container installed inside a furnace body, and the work storage container placed on this rail section are moved in the vertical direction relative to the rail section while being transported in a predetermined transport direction along the rail section, so that the storage container can be transported with substantially no load.

In conventional heat treatment furnaces for brazing, a storage container loaded with ceramic metal substrates is transported by a mesh belt. The mesh belt slides on a base during transport. Therefore, wear powder generated by wear between the mesh belt and the base adheres to the ceramic metal substrates, decreasing the yield of the ceramic metal substrates.

In addition, tension is generated in the mesh belt due to the weight of the ceramic metal substrate and the storage container. As a result, the mesh belt stretches and deforms, and needs to be replaced, resulting in increased equipment cost of the heat treatment furnace.

The storage container has a larger size than the ceramic metal substrate because the ceramic metal substrate is placed with room in the front, rear, left and right directions when placed in the storage container. For this reason, if the ceramic metal substrate is placed substantially in the center of the bottom surface of the storage container and heat treatment is repeated, and if the storage container is made of a metal, the bottom plate of the storage container is likely to deform downward into a convex shape. A storage container with a bottom plate deformed downward into a convex shape is likely to rotate around the convex portion, causing the storage container to be misaligned in transport and to stop inside the furnace in transport.

Therefore, there is a demand for enabling transport of a storage container, which is made of a metal such as stainless steel and stores a ceramic metal substrate, inside a heat treatment furnace with substantially no load on the storage container. This makes it possible to reduce equipment cost of a heat treatment furnace apparatus, improve yield of ceramic metal substrates, and improve production efficiency of ceramic metal substrates.

Figure 4A:
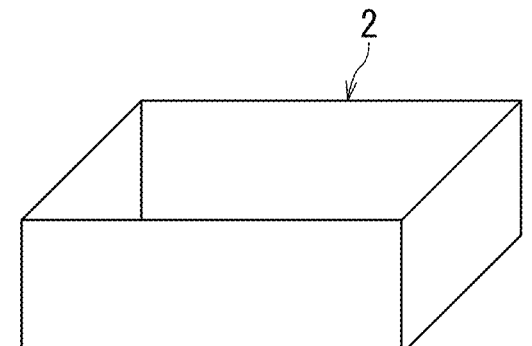
Figure 4B:
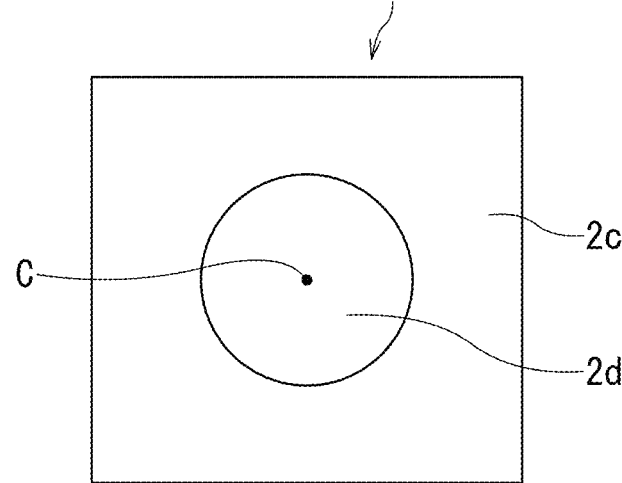
Figure 4C:
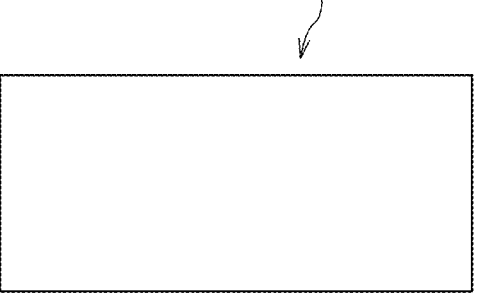

Each of FIGS. 4A to 4C is a view showing a storage container constituting the heat treatment furnace apparatus according to the embodiment.

Figure 2:
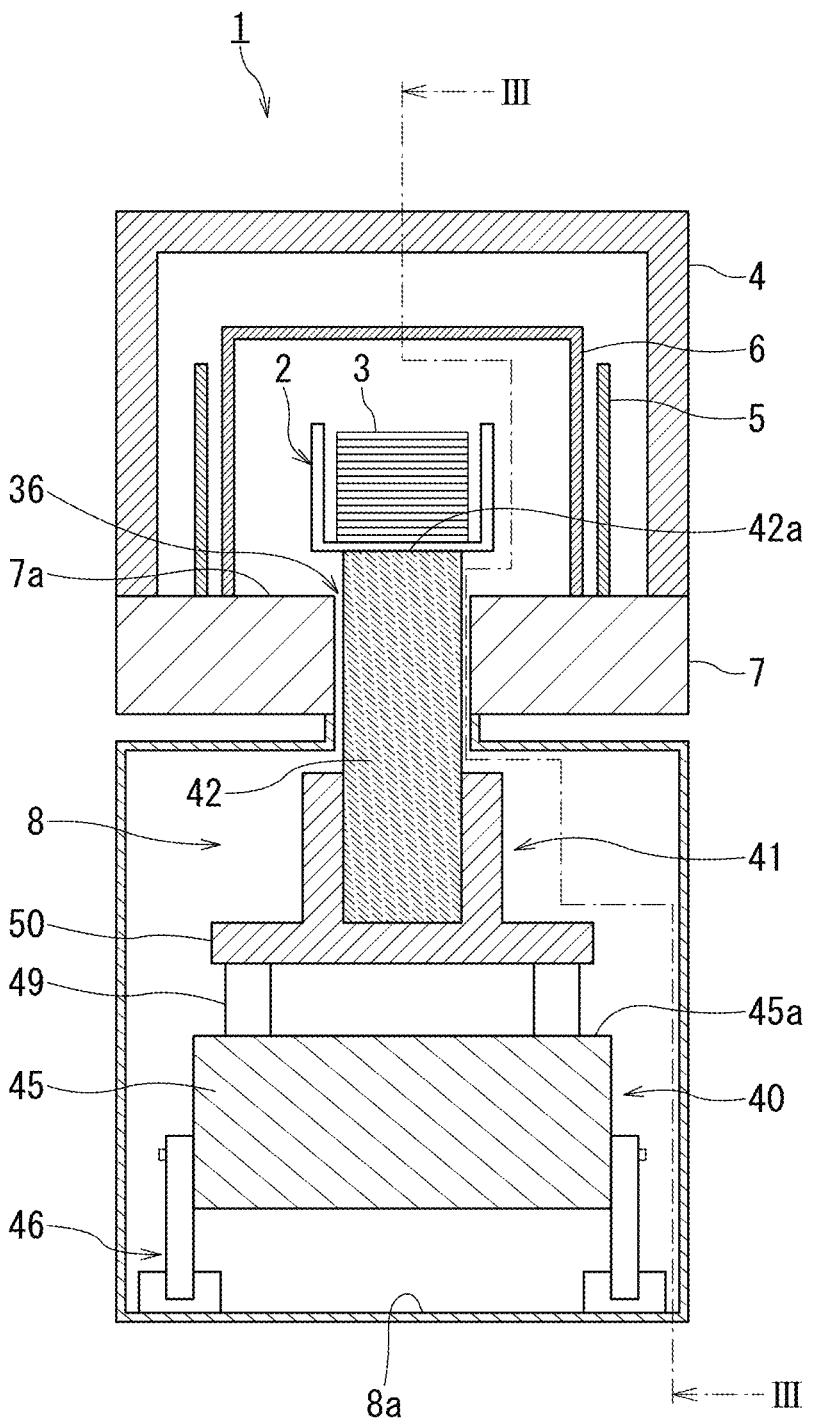
FIG. 2 is a cross-sectional view taken along a line II-II in FIG. 3 of the heat treatment furnace apparatus shown in FIG. 1.
Figure 5:
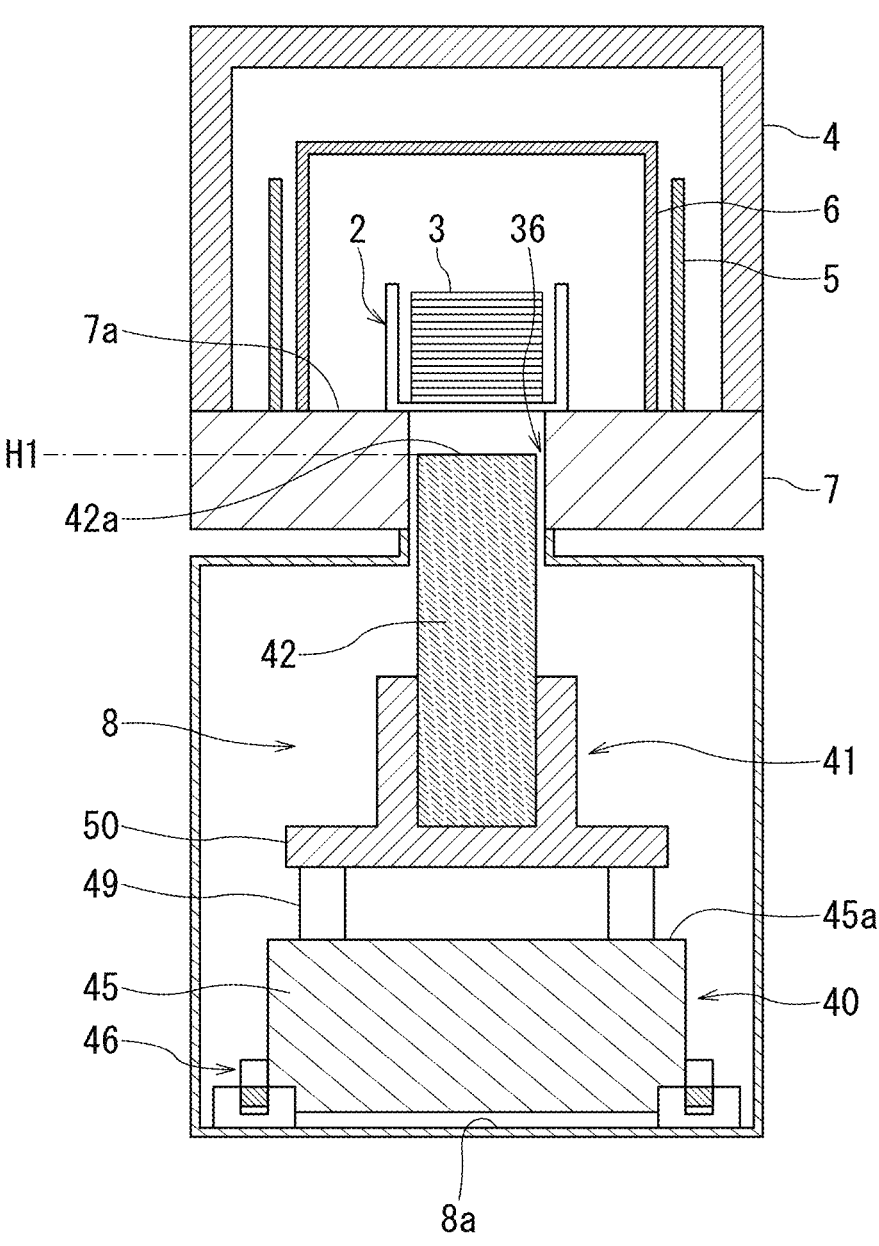

FIG. 5 is a cross-sectional view corresponding to a cross section of the heat treatment furnace apparatus shown in FIG. 2, showing a state in which storage containers have been moved to a container placement surface.

Figure 3:
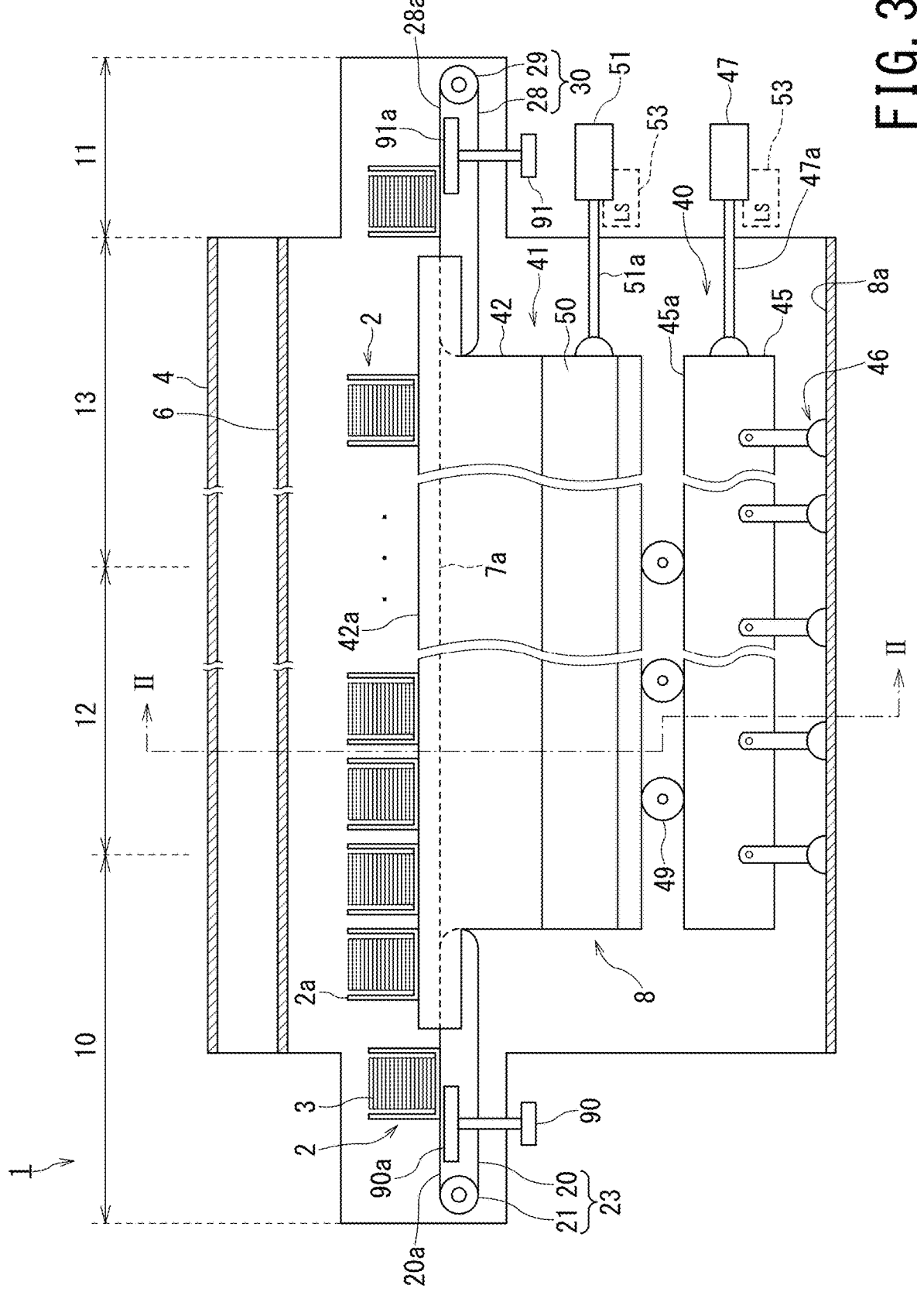
FIG. 3 is a cross-sectional view taken along a line III-III in FIG. 2 of the heat treatment furnace apparatus shown in FIG. 1.
Figure 6:
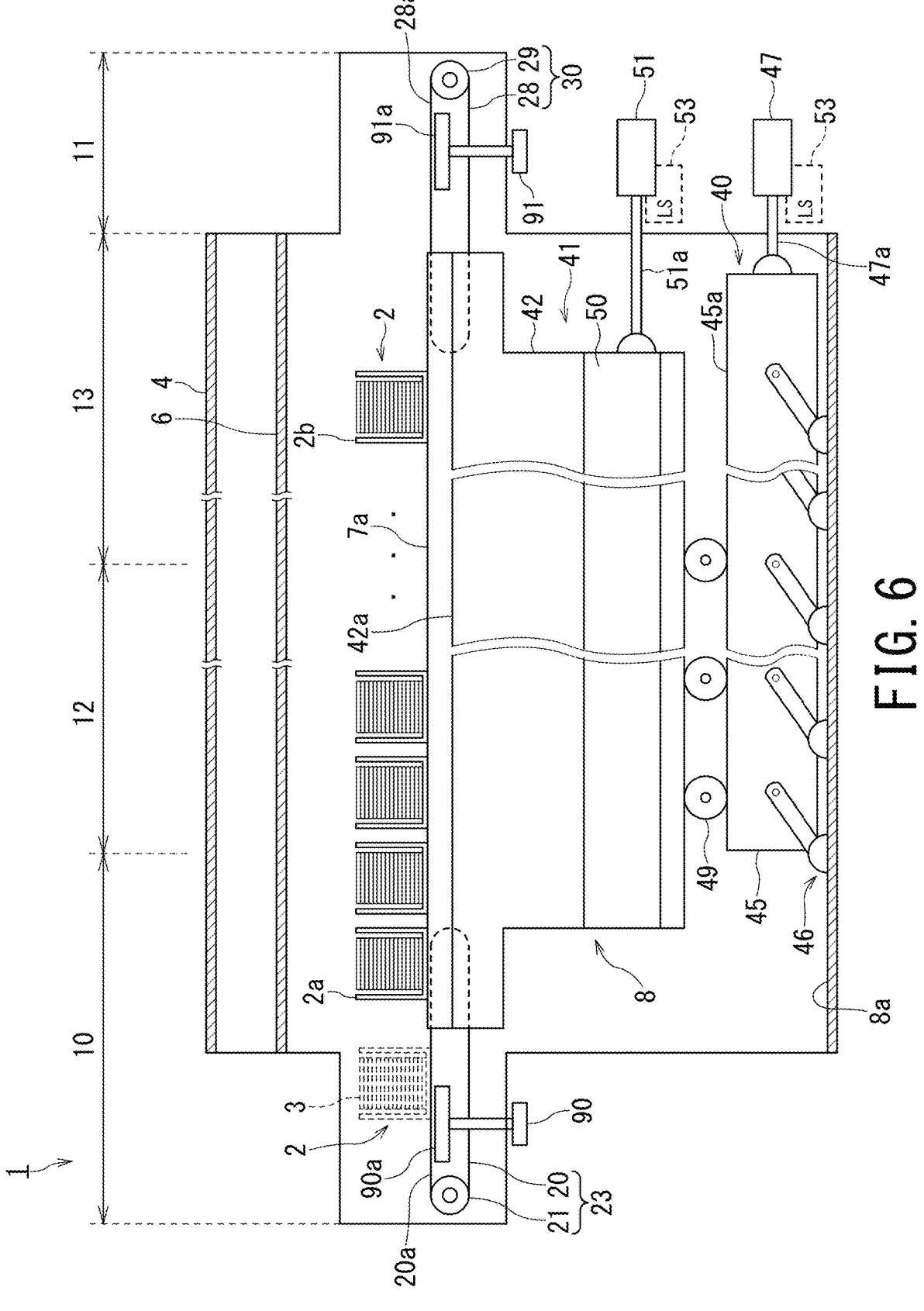

FIG. 6 is a cross-sectional view corresponding to a cross section of the heat treatment furnace apparatus shown in FIG. 3, showing a state in which the storage containers have been moved to the container placement surface.

Figure 7:
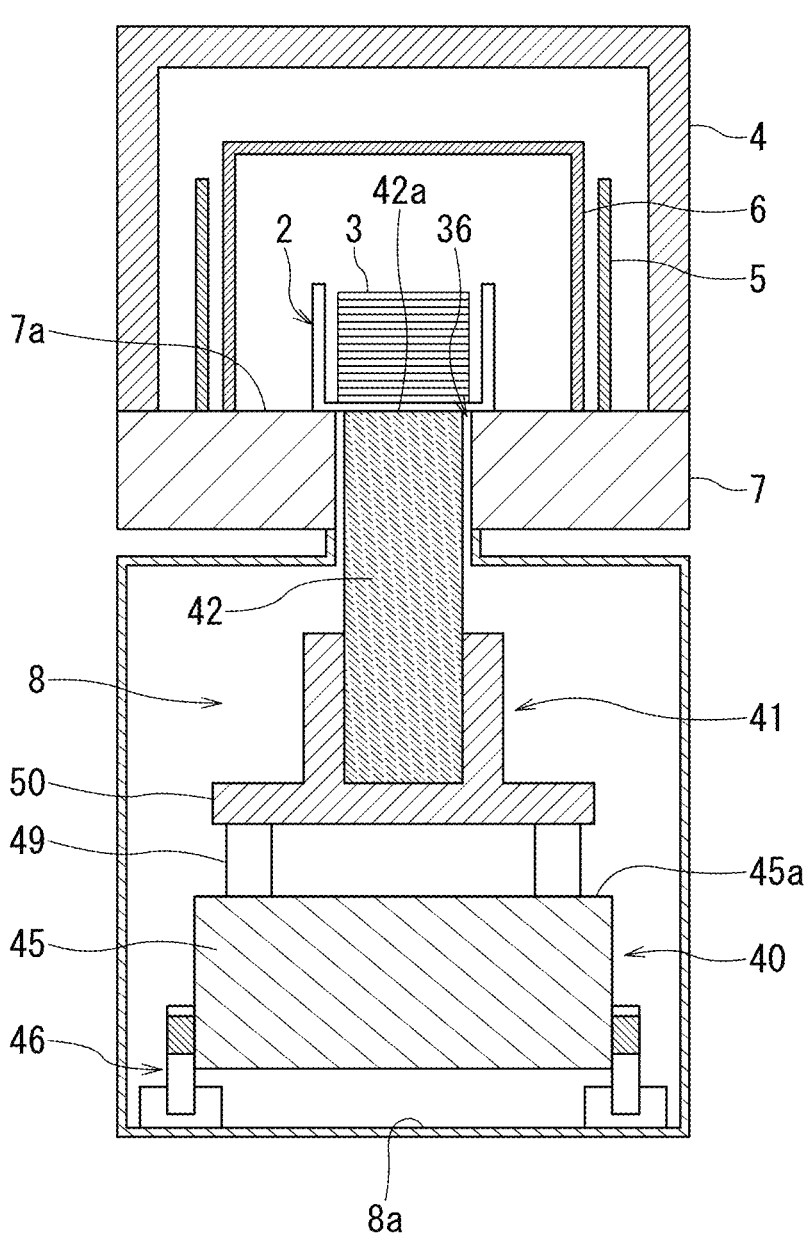

FIG. 7 is a cross-sectional view corresponding to the cross section of the heat treatment furnace apparatus shown in FIG. 2, showing a state in which the storage containers are supported by the container placement surface and a container support surface.

Figure 8:
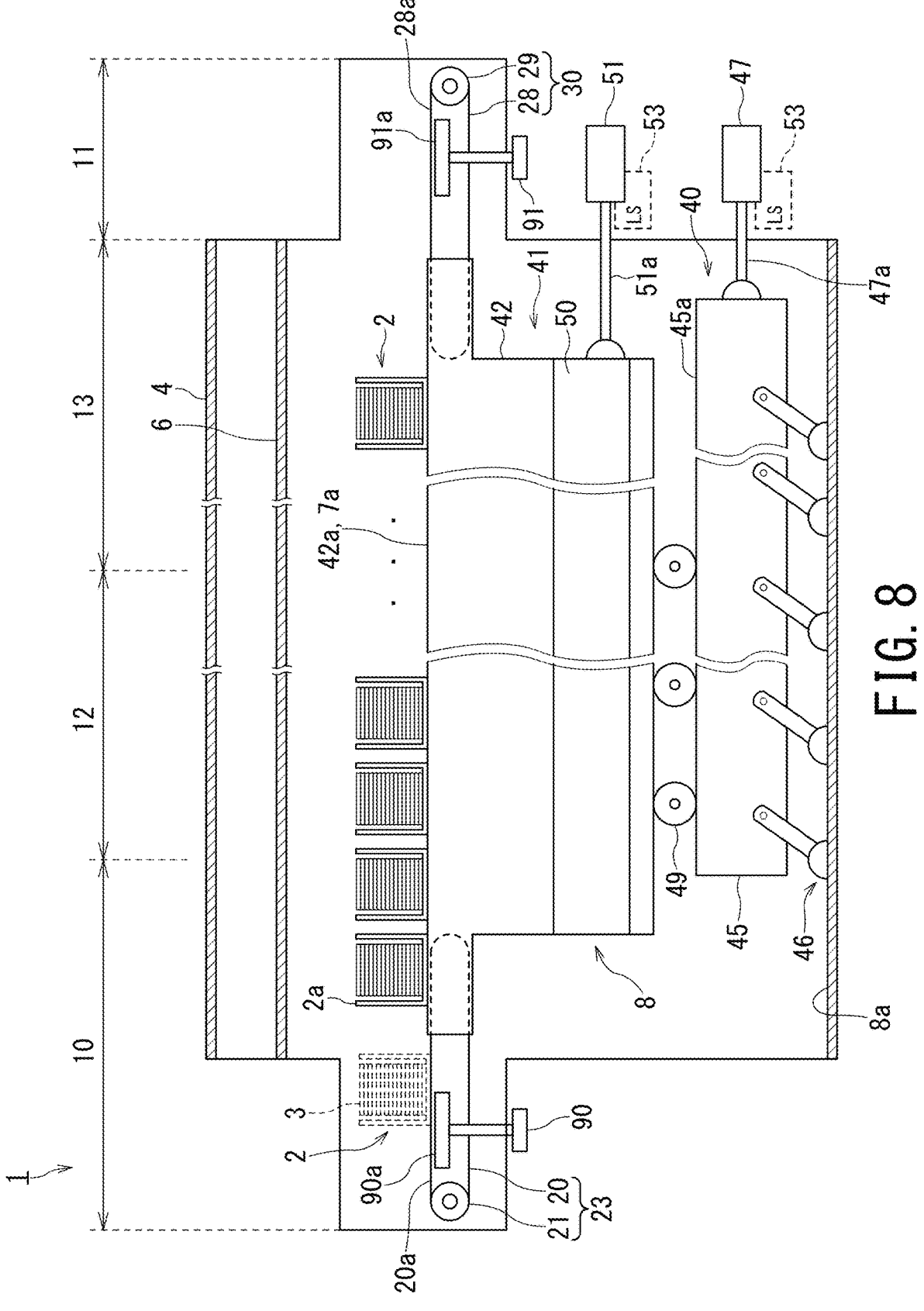

FIG. 8 is a cross-sectional view corresponding to the cross section of the heat treatment furnace apparatus shown in FIG. 3, showing a state in which the storage containers are supported by the container placement surface and the container support surface.

Figure 9:
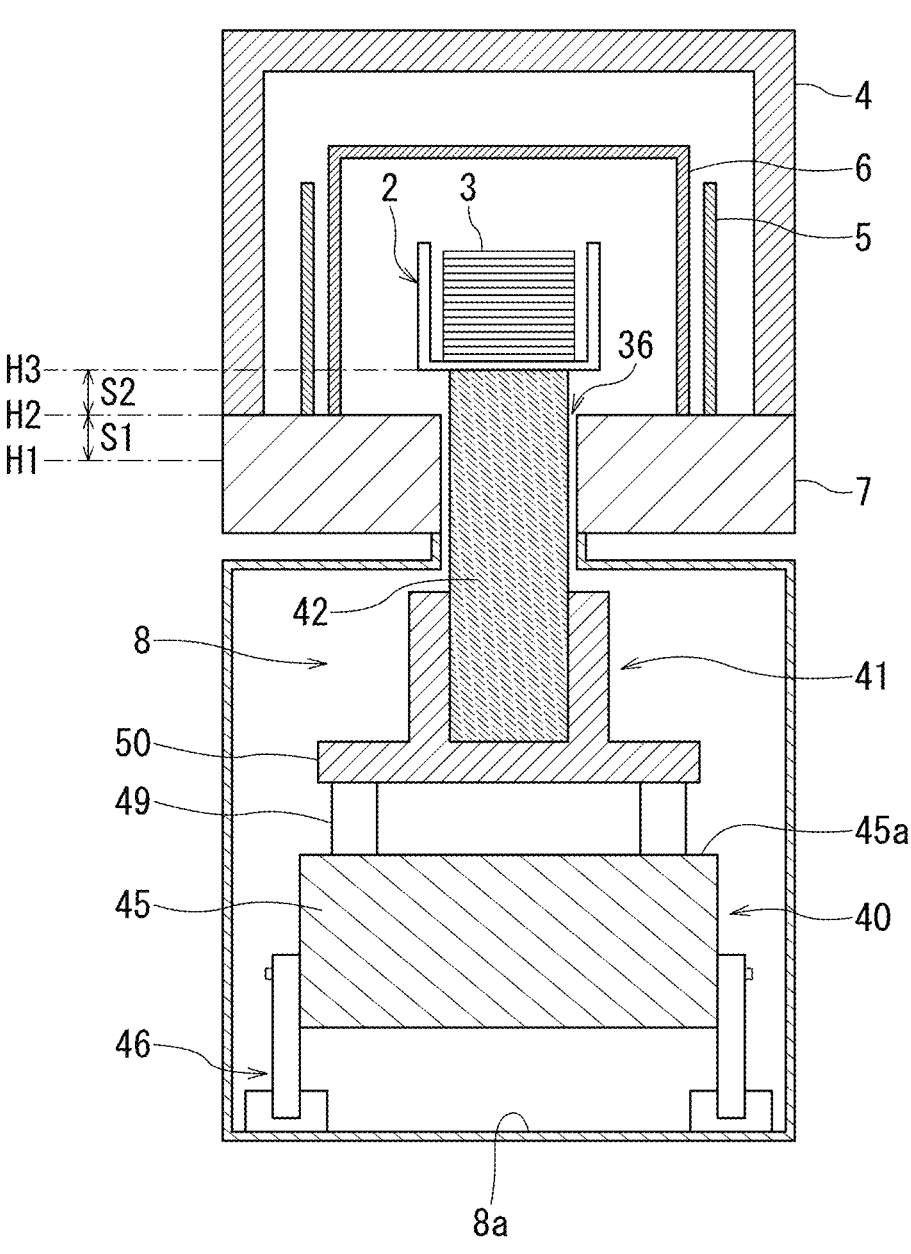

FIG. 9 is a cross-sectional view corresponding to the cross section of the heat treatment furnace apparatus shown in FIG. 2, showing a state in which the storage containers are supported only by the container support surface.

Figure 10:
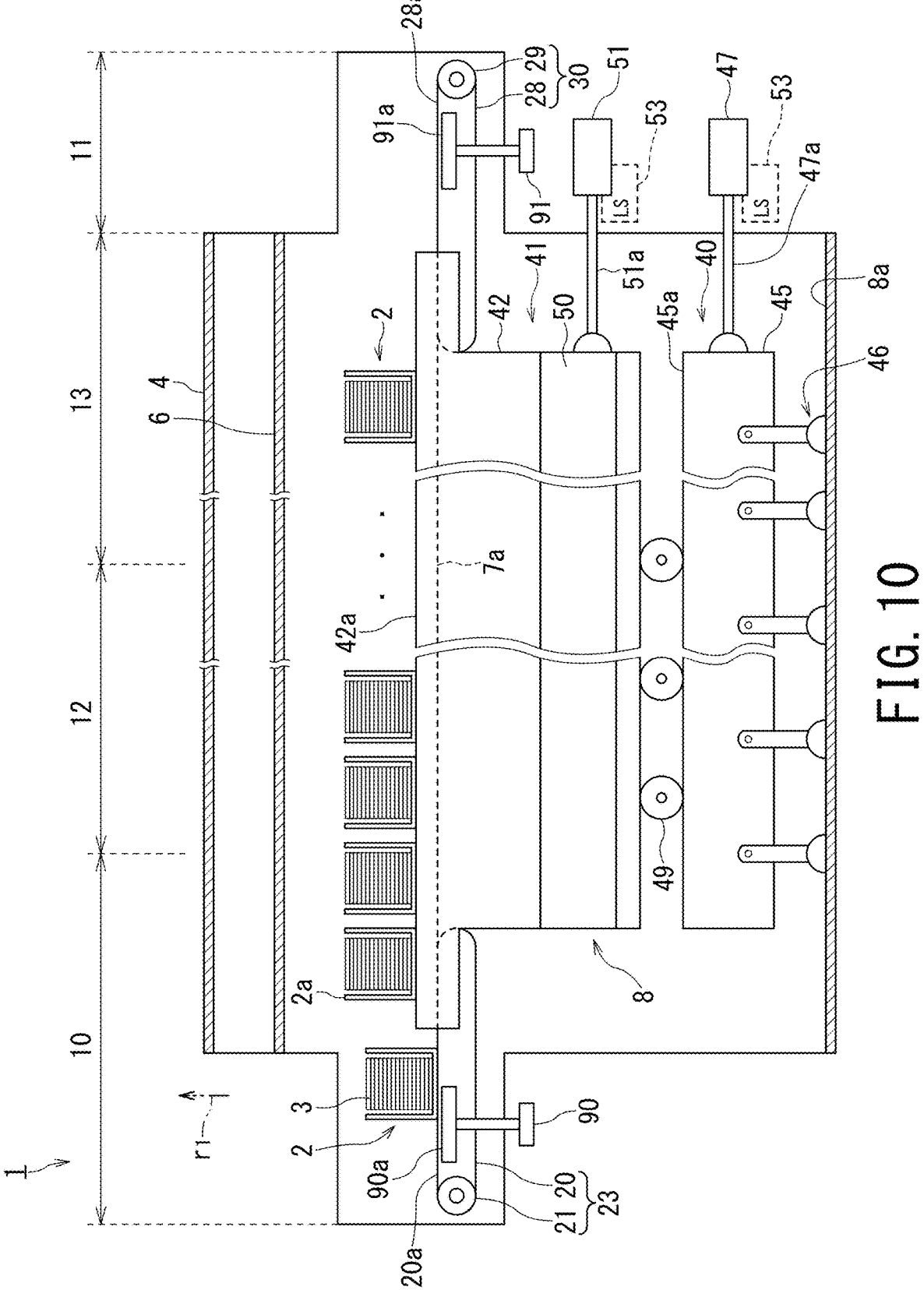

FIG. 10 is a cross-sectional view corresponding to the cross section of the heat treatment furnace apparatus shown in FIG. 3, showing a state in which the storage containers are supported only by the container support surface.

Figure 11:
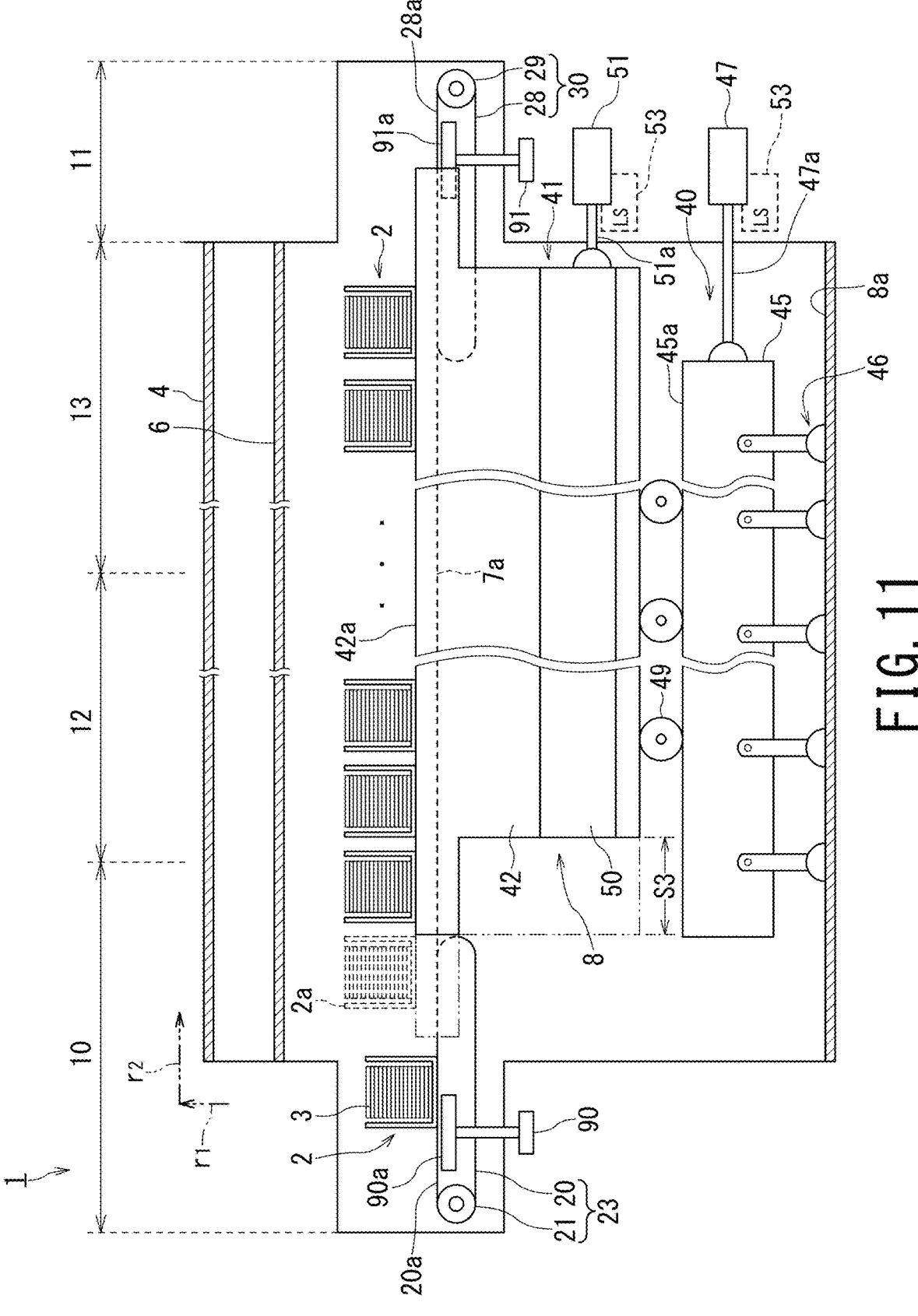

FIG. 11 is a cross-sectional view corresponding to the cross section of the heat treatment furnace apparatus shown in FIG. 3, showing a state in which the storage containers have been moved integrally with a container support plate in a transport direction from the state shown in FIG. 10.

Figure 12:
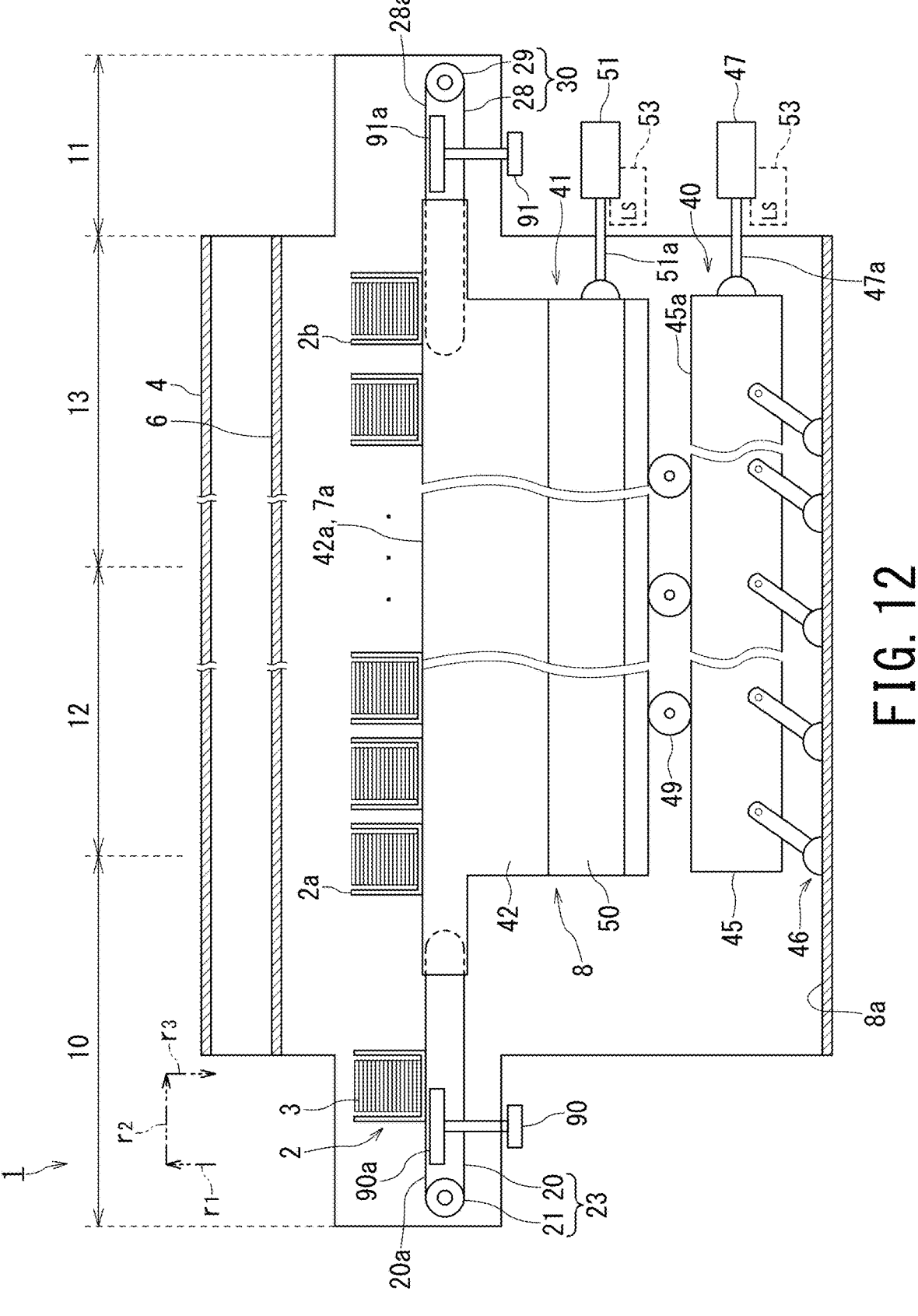

FIG. 12 is a cross-sectional view corresponding to the cross section of the heat treatment furnace apparatus shown in FIG. 3, showing a state in which the storage containers have been lowered integrally with the container support plate from the state shown in FIG. 11, and are supported by the container placement surface of a rail section and the container support surface of the container support plate.

Figure 13:
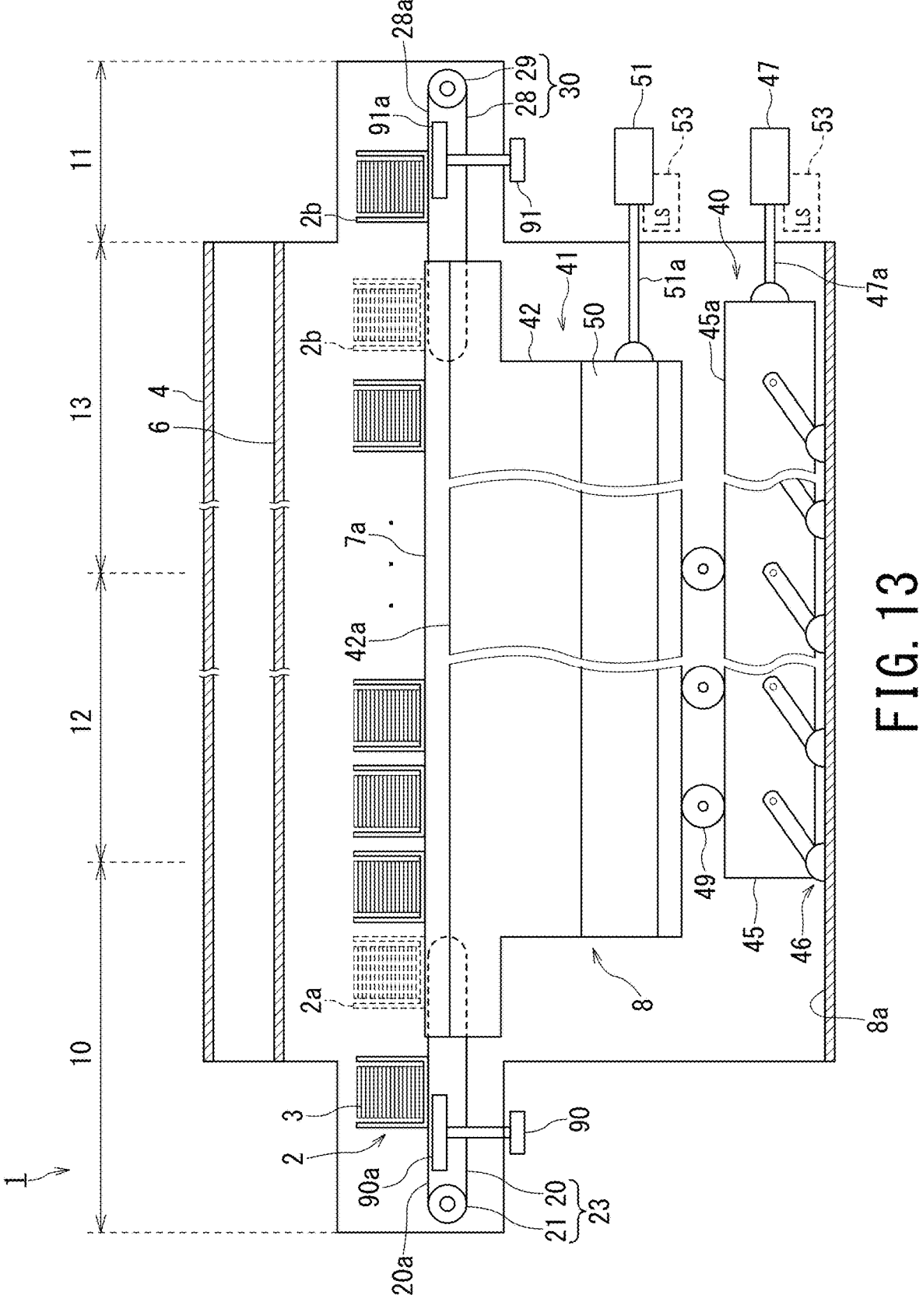

FIG. 13 is a cross-sectional view corresponding to the cross section of the heat treatment furnace apparatus shown in FIG. 3, showing a state in which the storage containers and the container support plate are integrally lowered from the state shown in FIG. 10, and the height of the container support surface of the container support plate is lowered below the height of the container placement surface of the rail section.

Figure 14:
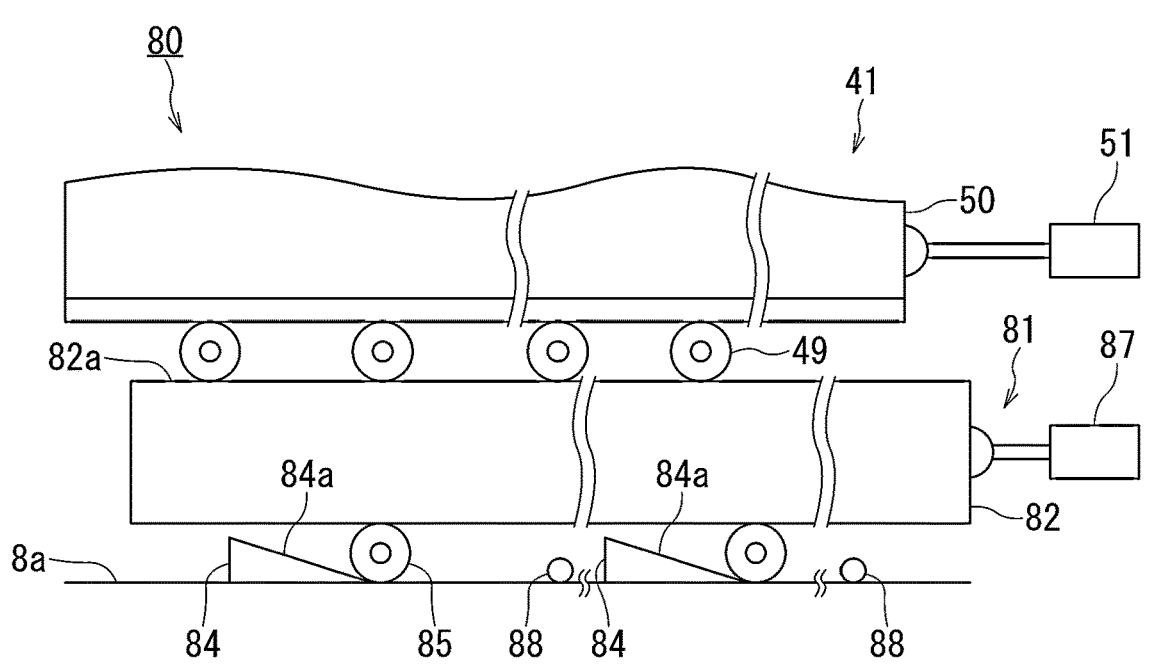

FIG. 14 is a cross-sectional view showing an in-furnace container transport unit of a heat treatment furnace apparatus according to a second embodiment.

Figure 15:
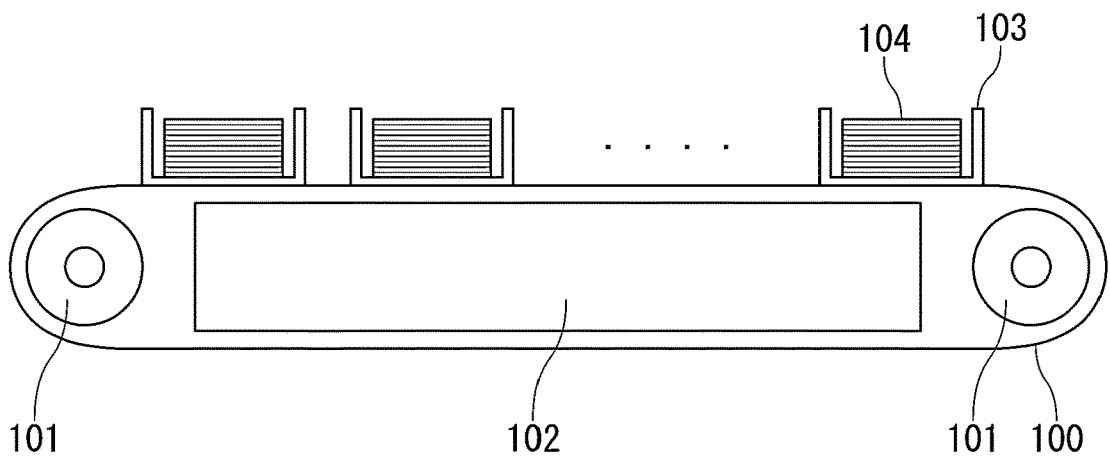

FIG. 15 is a view showing a conventional belt-type heat treatment furnace.

DETAILED DESCRIPTION

When a metal plate is brazed to a ceramic substrate to join them, a heat treatment furnace apparatus according to an embodiment heats a storage container, made of stainless steel, that contains a plurality of ceramic metal substrates, and performs heat treatment on the plurality of ceramic metal substrates at 600 degrees Celsius or higher and lower than 950 degrees Celsius. The heat treatment furnace apparatus includes a rail section that transports the storage container placed inside the furnace body, and a transport device that transports the storage container placed on the rail section in a predetermined transport direction along the rail section while moving the storage container placed on the rail section in a direction perpendicular to the rail section.

In the heat treatment furnace apparatus, the transport device includes a first moving device for moving the storage container in the transport direction, and a second moving device for integrally moving the storage container and the first moving device in the vertical direction.

In the heat treatment furnace apparatus, the first moving device includes a container support plate for supporting the storage container, a support member for supporting the container support plate, and a first moving mechanism for moving the support member in the transport direction. The second moving device includes a support plate for supporting the support member so as to be movable in the transport direction, and a second moving mechanism for raising and lowering the support plate.

In the heat treatment furnace apparatus, the rail section has a central portion in which a space passing therethrough in a vertical direction is formed in the transport direction. The rail section has an upper space configured as a transport space for the storage container. The rail section has an upper surface configured as a placement surface for the storage container.

In the heat treatment furnace apparatus, the container support plate is supported by the support member in a state in which the container support plate is inserted into the space of the rail section with an upper surface of the container support plate being parallel to a storage container placement surface of the rail section.

In the heat treatment furnace apparatus, the rail section includes an inlet side chain belt mechanism such that there are provided an endless circular inlet side chain belt section and a drive section that circulates the inlet side chain belt section, a downstream end portion of a transport surface of the inlet side chain belt section is connected to an upstream end portion of the storage container placement surface of the rail section, and the transport surface of the inlet side chain belt section is disposed along the storage container placement surface. In addition, the rail section includes an outlet side chain belt mechanism such that there are provided an endless circular outlet side chain belt section and a drive section that circulates the outlet side chain belt section, an upstream end portion of a transport surface of the outlet side chain belt section is connected to a downstream end portion of the storage container placement surface of the rail section, and the transport surface of the outlet side chain belt section is disposed along the storage container placement surface. The container support plate is configured such that when a height of the upper surface of the container support plate coincides with a height of the storage container placement surface of the rail section, an upstream end portion of the upper surface of the container support plate overlaps a downstream end portion of the transport surface of the inlet side chain belt section. In addition, the container support plate is configured such that a downstream end portion of the upper surface of the container support plate overlaps an upstream end portion of the transport surface of the outlet side chain belt section.

In the heat treatment furnace apparatus, the inlet side chain belt section and the outlet side chain belt section preferably include a space passing through a central portion in a vertical direction. When the space is provided, a mechanism is provided such that the space of the inlet side chain belt section has an inlet side lift platform connected to an inlet side lift cylinder, the mechanism is at a same height as a loading section of an inlet side loading mechanism at a higher position than an upper surface of the inlet side chain belt section; and the storage container is transported from the loading section, and then the inlet side lift cylinder is lowered, thereby placing the storage container on the inlet side chain belt section. Furthermore, when the space is provided, a mechanism is provided such that the space of the outlet side chain belt section has an outlet side lift platform connected to an outlet side lift cylinder, the outlet side lift platform, which is at a position lower than an upper surface of the outlet side chain belt section, is raised by the outlet side lift cylinder to the storage container located downstream of the outlet side chain belt section, and thus the outlet side lift platform moves to a same height as a discharge section of an outlet side unloading mechanism, and the storage container is transported to an unloading section.

In the heat treatment furnace apparatus, a heat treatment furnace apparatus is preferably such that the transport device is a device for moving the storage containers so as to draw a square pulse-shaped path while placing the storage containers on the rail section with required intervals therebetween.

In the heat treatment furnace apparatus, the furnace body preferably has an inert gas atmosphere, and is configured to allow the inert gas to flow into the furnace body from an outside and to flow out of the furnace body.

In the heat treatment furnace apparatus, the second moving mechanism preferably has a link mechanism for raising and lowering the support plate with its support surface parallel to the transport direction, and is configured to reciprocate the support plate parallel to the transport direction to raise and lower the support plate via the link mechanism.

In the heat treatment furnace apparatus, a second moving mechanism preferably includes: a moving mechanism aid plate provided so as to be movable in the transport direction relative to the furnace body, a plurality of protruding portions each having a sloped surface, the sloped surface being provided at predetermined intervals in the transport direction on a base surface of this moving mechanism, having one end portion on an upstream side protruding upward, and being sloped upward toward the protruding one end portion from the other end portion on a downstream side of the base surface, and a plurality of rollers, rotatably connected to the moving mechanism aid plate, for reciprocating while rotating on the sloped surface of a protruding portion on an upper surface of the base surface. The heat treatment furnace apparatus is preferably configured such that the moving mechanism aid plate is reciprocated in parallel to the transport direction, and thereby the moving mechanism aid plate is raised and lowered integrally with the rollers by reciprocating the rollers along the sloped surface in a state in which the support surface of the moving mechanism aid plate is parallel to the transport direction.

The heat treatment furnace apparatus is preferably configured such that the heater is installed in a vertical direction on an outer side surface of the furnace body, and a position of the heater is at a same height as that of the storage container when the storage container is on the rail section.

The heat treatment furnace apparatus preferably includes the storage container, wherein a hole portion is formed on a bottom surface of the storage container so as to include a central portion of the storage container.

The heat treatment furnace apparatus as described above causes the storage container storing the plurality of ceramic metal substrates not to be slid on the rail section inside the furnace body. This allows the storage container to be transported in a substantially unloaded state, and allows the heat treatment to be performed on the container in the unloaded transporting state. Therefore, the heat treatment furnace apparatus allows for avoiding friction and wear between the storage container and the container placement surface of the rail section. This makes it unnecessary to replace the worn mesh belt or rail section, which has occurred in conventional heat treatment furnaces. This then allows for dramatically reducing the equipment cost of the heat treatment furnace apparatuses.

Furthermore, the heat treatment furnace apparatus as described above prevents friction and wear from occurring between the storage container and the container placement surface of the rail section. This allows for avoiding the adhesion of the wear powder, which is generated by wear between the storage container and the rail section, to the ceramic metal substrate. This then allows for maintaining a high yield of ceramic metal substrates.

Furthermore, the heat treatment furnace apparatus as described above allows for transporting the storage container in a substantially unloaded state. This makes it unnecessary to replace the belt due to elongation as in the conventional belt-type, and allows for reducing maintenance cost.

The heat treatment furnace apparatus as described above will be described in detail with reference to the attached drawings. Here, this embodiment will be described with an example in which the heat treatment furnace apparatus is a brazing furnace apparatus, which is a furnace apparatus that performs heat treatment of ceramic metal substrates in brazing.

Figure 1:
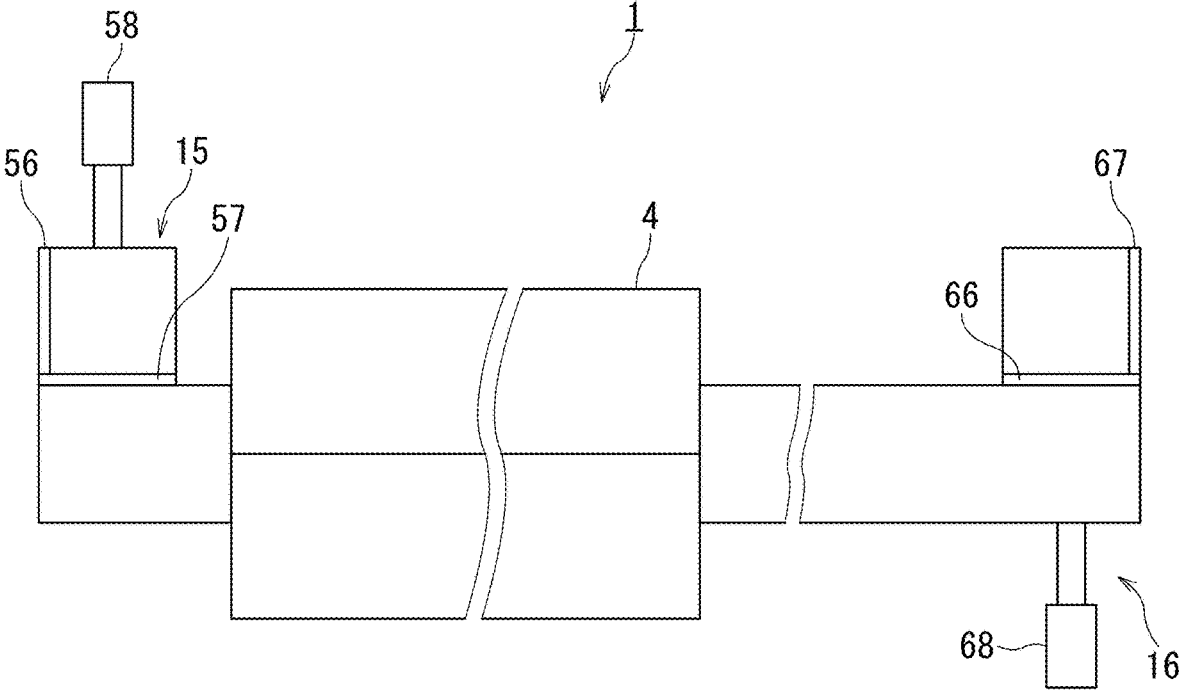
FIG. 1 is a plan view showing a heat treatment furnace apparatus according to an embodiment.

FIG. 1 is a plan view of the heat treatment furnace apparatus according to the embodiment, as seen from above. FIG. 2 is a cross-sectional view, taken along a line II-II in FIG. 3, of the heat treatment furnace apparatus shown in FIG. 1. FIG. 3 is a cross-sectional view, taken along a line III-III in FIG. 2, of the heat treatment furnace apparatus shown in FIG. 1. FIGS. 4A to 4C are respectively a perspective view, a plan view and a side view of a storage container constituting the heat treatment furnace apparatus shown in FIG. 1. FIG. 1 shows a heat treatment furnace apparatus 1 according to the embodiment. The heat treatment furnace apparatus 1 comprises an outer wall 4, an inlet side loading mechanism 15, and an outlet side unloading mechanism 16. The outer wall 4 includes a walking hearth type heating furnace. Features of a walking hearth type heating furnace include the fact that transport by a moving hearth prevents the material from being rubbed with the hearth, as in a pusher furnace, and creates no scratches caused by sliding, and absence of a heating mechanism in the lower portion of the furnace makes the structure simpler than that of a walking beam furnace. The inlet side loading mechanism 15 is provided with opening/closing mechanisms 56 and 57 and a pusher 58. The outlet side unloading mechanism 16 is provided with opening/closing mechanisms 66 and 67 and a pusher 68.

In FIGS. 1 to 4C, the heat treatment furnace apparatus 1 has a plurality of ceramic metal substrates 3 before joining placed in a storage container 2 made of stainless steel or the like that has been transported from a printing/drying and metal plate placing process (not shown). For example, the heat treatment furnace apparatus 1 is an apparatuses that performs heat treatment on each ceramic metal substrate 3 having a ceramic substrate made of silicon nitride or the like, on each of the front and back surfaces of which an active metal brazing material containing silver or copper is printed and dried, and further on each of the front and back surfaces of which a metal plate such as a copper plate is placed. The storage container 2 may be part of components the heat treatment furnace apparatus 1, or may be an external component of the heat treatment furnace apparatus 1. Each ceramic metal substrate 3 is an external component of the heat treatment furnace apparatus 1.

As shown in FIG. 2, the heat treatment furnace apparatus 1 comprises an outer wall 4, a heater 5 for heating the ceramic metal substrates 3, a furnace body 6, a rail section 7, and an in-furnace container transport unit 8 serving as a transport device. The furnace body 6 has an inert gas atmosphere. The rail section 7 is installed along a horizontal plane inside the furnace body 6 for transporting the storage container 2 for the ceramic metal substrates 3 inside the furnace. The in-furnace container transport unit 8 is provided inside the furnace body 6. The in-furnace container transport unit 8 is used for transporting the storage containers 2 storing the ceramic metal substrates 3 inside the furnace body 6 along the longitudinal direction of the rail section 7 while placing the storage containers 2 on the rail section 7 at required intervals. The longitudinal direction is the transport direction of the ceramic metal substrates 3. The furnace body 6 is provided inside the outer wall 4 so as to cover the storage container 2 being transported. In addition, it is preferable that the outer periphery of the furnace body 6 be arranged close to the storage container 2 from the viewpoint of the efficiency of heating the ceramic metal substrates 3. For example, the outer periphery of the furnace body 6 is preferably provided inside the heater 5. There is a configuration such that the inert gas enters through a predetermined gas inlet in the furnace body 6 and is discharged from a predetermined gas outlet therein. Note that the heat treatment atmosphere of the heat treatment furnace apparatus 1 according to this embodiment is not limited to an inert atmosphere if there is no problem in performing brazing process, and may be a reducing atmosphere such as hydrogen, air, or vacuum.

As shown in FIG. 3, the furnace body 6 comprises a furnace inlet section 10 that serves for an inlet when the storage container 2 is loaded into the furnace body 6, a furnace outlet section 11 that serves for an outlet when the storage container 2 is unloaded outside the furnace body 6, a heating section 12 connected to the furnace inlet section 10, and a cooling section 13 for cooling the ceramic metal substrates 3 inside the storage container 2.

The heater 5 is mounted on the outer wall side of the heating section 12 of the furnace body 6 in the up-down direction as shown in FIG. 2. The heater 5 heats the ceramic metal substrates 3 inside the storage container 2 that has been transported into the heating section 12 through the furnace inlet section 10 to braze the ceramic substrate and metal plate, which form each ceramic metal substrate 3.

For each ceramic metal substrate 3, a ceramic substrate with a larger area is used to improve productivity. In order to place and join a metal plate with an area similar to that of the ceramic substrate, it is necessary to evenly heat the circumferential portion and central portion of the ceramic metal substrate 3. For this reason, it is preferable that the heater 5 heat the storage container 2 from the sides when it is placed on the container placement surface 7*a*. Furthermore, it is preferable that each heater 5 extend to the lateral side of the rail section 7 to heat the storage container 2 from lower side of the bottom surface thereof.

A predetermined area of the heating section 12 on the furnace inlet section 10 side is configured as a preheating section for preheating each ceramic metal substrate 3, and the remaining area thereof is configured as a joining zone for joining each ceramic metal substrates 3. In the heat treatment for brazing in this embodiment, the heater 5 heats the preheat zone to a temperature of 400 degrees Celsius or more and less than 700 degrees Celsius, and heats the joining zone to a temperature of 600 degrees Celsius or more and less than 950 degrees Celsius. At this time, the heat treatment temperature is appropriately selected depending on the metal material forming the brazing layer, but the temperature difference between the preheat zone and the joining zone is 100 degrees Celsius or more, preferably in the range of 100 degrees Celsius or more and 200 degrees Celsius or less.

The cooling section 13 of the furnace body 6 has its upstream end portion in the transport direction (hereinafter abbreviated as "upstream end portion") connected to the heating section 12, and has its downstream end portion therein (hereinafter abbreviated as "downstream end portion") connected to the furnace outlet section 11. The cooling section 13 cools each ceramic metal substrate 3 inside the storage container 2 that has been heated in the heating section 12.

The inlet side loading mechanism 15 of the heat treatment furnace apparatus 1 shown in FIG. 1 loads a storage container 2 into the furnace inlet section 10, and places it on the upstream end portion of the inlet side chain belt mechanism 23 in the rail section 7, the storage container 2 having been transported through a transport conveyor (not shown) or the like, and having a plurality of ceramic metal substrates 3.

The outlet side unloading mechanism 16 unloads the storage container 2 located at the downstream end portion of the rail section 7 from the furnace outlet section 11 and places it on a transport conveyor (not shown) or the like for the next process.

In FIG. 3, the rail section 7 is provided with an inlet side chain belt mechanism 23 and an outlet side chain belt mechanism 30. The inlet side chain belt mechanism 23 has endless circular inlet side chain belt sections 20 and a drive section 21 such as a roller that circularly drives the inlet side chain belt sections 20. The inlet side chain belt mechanism 23 is disposed so that the inlet side transport surface 20*a*, which is the upper surface of each inlet side chain belt sections 20, is aligned along a horizontal plane. The outlet side chain belt mechanism 30 has endless circular outlet side chain belt sections 28 and a drive section 29 such as a roller that circularly drives the outlet side chain belt sections 28. The outlet side chain belt mechanism 30 is disposed so that the outlet side transport surface 28*a*, which is the upper surface of each outlet side chain belt section 28, is aligned along a horizontal plane.

In a space of the inlet side chain belt sections 20 on the opposite side of the drive section 21, an inlet side lift platform 90 connected to an inlet side lift cylinder (not shown) is installed. The inlet side lift platform upper surface 90*a* is moved between the plurality of inlet side chain belt sections 20 in the vertical direction (up-down direction) relative to the inlet side transport surfaces 20*a* by the inlet side lift cylinder. In a space of the outlet side chain belt sections 28 on the opposite side of the drive section 29, an outlet side lift platform 91 connected to an outlet side lift cylinder (not shown) is installed. The outlet side lift platform upper surface 91*a* is moved between the plurality of outlet side chain belt sections 28 in the vertical direction relative to the outlet side transport surfaces 28*a* by the outlet side lift cylinder.

The downstream end portion of each inlet side transport surface 20*a* is arranged close to the upstream end portion of the heating section 12 and at a predetermined position upstream of the upstream end portion thereof. The furnace body 6 is also provided with a first photoelectric sensor (not shown) for detecting whether or not a storage container 2 is present at the downstream end portions of the inlet side transport surfaces 20*a*.

In FIGS. 2 and 3, the rail section 7 has the upstream end portion connected to the downstream end portions of the inlet side transport surfaces 20*a*. The rail section 7 is provided to face the furnace body 6 so that the container placement surface 7*a* is located along the inlet side transport surfaces 20*a*. The rail section 7 is disposed so that its downstream end reaches a position corresponding to the downstream end portion of the cooling section 13 in the furnace body 6.

The rail section 7 comprises the outlet side chain belt mechanism 30 disposed so that the upstream end portion of each outlet side transport surface 28*a* is connected to the downstream end portion of the rail section 7 and the outlet side transport surface 28*a* is located along the container placement surface 7*a*. The furnace body 6 is provided with a second photoelectric sensor (not shown) for detecting whether or not a storage container 2 is present at the upstream end portion of the outlet side transport surfaces 28*a*.

The storage container 2 has a plurality of ceramic metal substrates 3 placed on the bottom surface 2*c* (shown in FIGS. 4A to 4C) placed on the rail section 7 or the like. The storage container 2 just needs to be made of a material that is heat resistant, inexpensive, and easy to process, and is preferably stainless steel.

FIG. 4A shows a perspective view of the storage container 2. FIG. 4B shows a bottom view of the storage container 2. FIG. 4C shows a side view of the storage container 2. As shown in the bottom view, a hole portion 2*d* is formed in the bottom surface 2*c* of the storage container 2 so as to include the central portion C of the bottom surface 2*c*. The storage container 2 is designed to be larger in size than the ceramic metal substrate 3 so as to have room in the front, rear, left and right directions when the ceramic metal substrates 3 are placed therein. For this reason, if the ceramic metal substrates 3 are placed in the central portion C of the bottom surface 2*c* and heat treatment is repeated, the bottom surface 2*c* of a metal storage container 2 is likely to deform downward into a convex shape.

In the heat treatment furnace apparatus 1 according to this embodiment, the storage container 2 storing the ceramic metal substrates 3 can be made heavier than in a conventional belt furnace. However, as objects stored in the storage container 2 becomes heavier, the deformation of the bottom surface 2*c* becomes greater. For this reason, a hole portion 2*d* is provided to include the central portion C of the bottom surface 2*c* to prevent the bottom surface 2*c* from deforming convexly. Furthermore, providing a hole portion 2*d* in the bottom surface 2*c* can prevent the deformation from concentrating at one point and prevents the bottom surface 2*c* from rotating around the convex portion even if the bottom surface 2*c* deforms convexly because of the presence of the hole portion 2*d*.

The hole portion 2*d* shown in FIG. 4B is circular, but this is not limited to this case. For example, the hole portion 2*d* just needs to have no corners, and may be an ellipse or a rectangle with rounded corners. In this case, the diameter of the hole portion 2*d* is preferably 15% to 70% of the length of the short side of the bottom surface 2*c*. If the hole portion 2*d* of the bottom surface 2*c* of the storage container 2 is rectangular, the ratio is a ratio of the opening portion to the length of the corresponding side. If this ratio is less than 15%, a sufficient effect in preventing deformation cannot be obtained. If the ratio is more than 70%, the overall strength of the storage container 2 decreases.

The storage container 2 of the heat treatment furnace apparatus 1 according to this embodiment is not directly transported from the inlet side loading mechanism 15 to the inlet side transport surfaces 20*a*. Instead, the storage container 2 is moved to the inlet side lift platform 90 and then transported to the inlet side transport surfaces 20*a*. Therefore, a hole portion 2*d* provided in the storage container 2 is not caught by the chain belts and allows the storage container 2 to be moved. Similarly, when the storage container 2 is moved from the outlet side transport surfaces 28*a* to the outlet side unloading mechanism 16 via the outlet side lift platform 91, the hole portion 2*d* is not caught and allows storage container 2 to be moved.

In FIG. 2, the rail section 7 has a cross section perpendicular to the transport direction that is substantially rectangular. A gap 36 that passes through the central portion of the rectangle in the vertical direction is formed in the transport direction.

The upper surface of rail section 7 is arranged as a container placement surface 7*a* so as to be parallel to and connected to the inlet side transport surfaces 20*a* of the inlet side chain belt mechanism 23 and the outlet side transport surfaces 28*a* of the outlet side chain belt mechanism 30.

In FIGS. 2 and 3, the in-furnace container transport unit 8 comprises a first moving mechanism 40, a second moving mechanism 41, and a heat-resistant plate for supporting the storage container (hereinafter abbreviated as "container support plate") 42. The first moving mechanism 40 moves the storage container 2 in the vertical direction (up-down direction) relative to the base section 8*a* of the in-furnace container transport unit 8. The second moving mechanism 41 is moved in the vertical direction according to the vertical movement of the first moving mechanism 40, and reciprocates the container support plate 42 in the transport direction. The container support plate 42 is supported in the vertical direction by the second moving mechanism 41.

In FIG. 2, the container support plate 42 is inserted into the gap 36 in the transport direction of the rail section 7 so that its plate upper surface (hereinafter abbreviated as "container support surface") 42*a* is parallel to the container placement surface 7*a* of the rail section 7. The container support plate 42 is supported by the second moving mechanism 41.

In FIG. 3, the first moving mechanism 40 has a moving mechanism support plate 45 mounted to the base section 8*a*, the moving mechanism support plate 45 having a second moving mechanism support surface (hereinafter abbreviated as "moving mechanism support surface") parallel to the transport direction. The first moving mechanism 40 comprises a link mechanism 46 and a first hydraulic cylinder 47. The link mechanism 46 raises and lowers the moving mechanism support plate 45 with its moving mechanism support surface 45*a* parallel to the transport direction. The first hydraulic cylinder 47 reciprocates the moving mechanism support plate 45 parallel to the transport direction by the reciprocation of a piston 47*a*.

In FIG. 3, the second moving mechanism 41 comprises a support member 50 for supporting the container support plate, and a second hydraulic cylinder 51. The support member 50 is mounted on the moving mechanism support surface 45*a* of the moving mechanism support plate 45 in the first moving mechanism 40 via a plurality of rollers 49 so as to be freely reciprocated in the transport direction. The second hydraulic cylinder 51 reciprocates the support member 50 parallel to the transport direction by the reciprocation of a piston 51*a*.

Each of the first hydraulic cylinder 47 and the second hydraulic cylinder 51 is provided with a limit switch (LS) 53. The limit switches 53 detect the piston strokes of the first hydraulic cylinder 47 and the second hydraulic cylinder 51. Thereby, the limit switches 53 can detect both the moving position in the vertical direction and the moving position in the transport direction of the container support plate 42 based on the drive of the first moving mechanism 40 and the second moving mechanism 41.

When the height of the container support surface 42*a* of the container support plate 42 coincides with the height of the container placement surface 7*a* of the rail section 7, the upstream end portion of the container support surface 42*a* overlaps the downstream end portion of the inlet side transport surfaces 20*a*. At the same time, the downstream end portion of the container support surface 42*a* overlaps the upstream end portion of the outlet side transport surfaces 28*a*.

In FIG. 1, the inlet side loading mechanism 15 is formed to transport the storage container 2, which has been transported by the transport rail or the like, into the heat treatment furnace. The inlet side loading mechanism 15 is configured to communicate with the inlet side chain belt sections 20. At this time, it is preferable that opening/closing mechanisms 56 and 57 such as shutters be provided so that the atmosphere inside the heat treatment furnace does not leak to the outside. The opening/closing mechanisms 56 and 57 are each opened and closed by a drive cylinder. Furthermore, it is preferable that the outlet side unloading mechanism 16 be also provided with a transport rail, opening/closing mechanisms 66 and 67, drive cylinders, etc., like the inlet side loading mechanism.

Next, the overall operation of the heat treatment furnace apparatus 1 according to the embodiment will be described, focusing on the transport operation of the storage container 2.

First, the operation of loading the storage container 2 into the heat treatment furnace apparatus 1 will be described.

The plurality of storage containers 2, each of which stores a plurality of ceramic metal substrates 3 in multiple stacks, are transported in sequence to the inlet side loading mechanism 15 of the heat treatment furnace apparatus 1 through the transport rail by the operation of the transport conveyor. At this time, the opening/closing mechanism 57 of the inlet side loading mechanism 15 is closed, and the opening/closing mechanism 56 thereof is open.

Then, when the leading storage container 2 enters the inlet side loading mechanism 15, the opening/closing mechanism 56 closes, the inside of the inlet side loading mechanism 15 is replaced with, for example, nitrogen, and then the opening/closing mechanism 57 opens. This prevents the atmosphere inside the heat treatment furnace apparatus 1 from leaking to the outside. Next, the storage container 2 in the inlet side loading mechanism 15 is moved by the pusher 58 onto the inlet side lift platform 90 of the furnace inlet section 10. At this time, the inlet side lift platform 90 is raised, and the inlet side lift platform upper surface 90a is at a higher position than the inlet side transport surfaces 20a (this state is not shown). The pusher 58 returns and the opening/closing mechanism 57 closes. Next, the inlet side lift platform 90 is lowered. In the process of the inlet side lift platform upper surface 90a moving toward a lower position than the inlet side transport surfaces 20a, the storage container 2 placed on the inlet side lift platform upper surface 90a is placed on the upstream end portion of the inlet side transport surfaces 20a.

Next, the inlet side chain belt sections 20 are circulated by the drive section 21. Thereby, the storage container 2 placed on the upstream end portion of the inlet side transport surfaces 20a is moved to the downstream end portion of the inlet side transport surfaces 20a. In other words, the storage container 2 is moved onto the upstream end portion of the container placement surface 7a of the overlapped rail section 7.

Next, the storage container 2 is transported by the operation of the in-furnace container transport unit 8 and is moved from the downstream end portion of the inlet side transport surfaces 20a, which is the detection position of the first photoelectric sensor (not shown). At this time, the first photoelectric sensor transmits a container loading command signal. This causes a control operation to be performed to load the storage container 2 into the heat treatment furnace apparatus 1. Hereinafter, each time the container loading command signal is transmitted from the first photoelectric sensor, one of the plurality of storage containers 2 is sequentially loaded into the heat treatment furnace apparatus 1.

Next, transport operation of the storage container 2 inside the heat treatment furnace apparatus 1 will be described.

In a state in which the container loading operation process has moved the storage container 2a of the storage containers 2 onto the container placement surface 7a of the rail section 7, FIGS. 5 and 6 respectively show cross-sectional views of the heat treatment furnace apparatus 1 corresponding to FIGS. 2 and 3.

In FIGS. 5 and 6, when the storage container 2a is moved onto the container placement surface 7a, the moving mechanism support plate 45 of the first moving mechanism 40 is lowered to a predetermined position, and the container support surface 42a is placed at a lower position than the container placement surface 7a. The height of the container support surface 42a at this time is defined as H1.

Therefore, all storage containers 2, including the storage container 2a, are placed on the container placement surface 7a of the rail section 7. At this time, the reference numeral and character for the storage container located furthest downstream is defined as "2b".

In the pre-transport state of the storage containers 2, the first hydraulic cylinder 47 is driven to move the piston 47a in the opposite direction of the transport direction (upstream). As a result, the moving mechanism support plate 45 is raised with the moving mechanism support surface 45a parallel to the transport direction by the operation of the link mechanism 46.

As the moving mechanism support plate 45 is raised, then second moving mechanism 41 is raised integrally with the moving mechanism support plate 45, and the container support plate 42 supported by the support member 50 of the second moving mechanism 41 is also raised integrally.

When the container support plate 42 is raised and the height of its container support surface 42a coincides with the height of the container placement surface 7a, the storage container 2 placed on the container placement surface 7a is supported by the container support surface 42a of the container support plate 42. The height of the container support surface 42a at this time is defined as H2 (shown in FIG. 9).

In a state in which the storage container 2a is supported by the container placement surface 7a of the rail section 7 and the container support surface 42a of the container support plate 42, FIGS. 7 and 8 show cross-sectional views of the heat treatment furnace apparatus 1 corresponding to FIGS. 2 and 3.

In FIGS. 7 and 8, in a state in which the storage containers 2 are supported by the container placement surface 7a of the rail section 7 and the container support surface 42a of the container support plate 42, the first hydraulic cylinder 47 is driven to move the piston 47a in the opposite direction of the transport direction, to raise the moving mechanism support plate 45.

As the moving mechanism support plate 45 is raised, the container support plate 42 is also raised integrally and the height of the container support surface 42a of the container support plate 42 is raised above the height of the container placement surface 7a of the rail section 7. All storage containers 2 that has been placed on the container placement surface 7a are now separated from the container placement surface 7a and are supported only by the container support surface 42a of the container support plate 42.

The piston stroke amount of the first hydraulic cylinder 47 detected by the limit switch detects that: the storage containers 2 have been separated from the container placement surface 7a; and the container support surface 42a has been raised to a predetermined position (height H3). This detection result stops the drive of the first hydraulic cylinder 47, and stops the raising of the container support plate 42 and the storage containers 2.

In a state in which the storage container 2a has been separated from the container placement surface 7a of the rail section 7 due to raising of the container support plate 42 and is supported only by the container support surface 42a of the container support plate 42, FIGS. 9 and 10 show cross-sectional views of the heat treatment furnace apparatus 1 corresponding to FIGS. 2 and 3.

In FIGS. 9 and 10, according to the drive of the first moving mechanism 40, the container support surface 42a is raised by a predetermined distance (S1+S2) from height H1 to H3. Accordingly, the storage containers 2 placed on the container placement surface 7a (height H2) of the rail section 7 are transported upward by the predetermined distance (S2). Here, the path of the storage container 2a at this time is indicated by an arrow r1 (shown in FIG. 10).

In a state in which the storage container 2a has been supported only by the container support surface 42a by the container support plate 42 to be transported upward in FIGS. 9 and 10, the second hydraulic cylinder 51 is driven to move the piston 51a by a predetermined stroke in the transport direction, and the support member 50 is moved in the transport direction on the moving mechanism support surface 45a via the rollers 49. The movement distance at this time is defined as S3.

In FIG. 11, according to the movement of the support member 50 in the transport direction, the container support plate 42 is moved in the transport direction integrally with the support member 50. Thereby, the storage containers 2 supported only by the container support surface 42a of the container support plate 42 is moved in the transport direction integrally with the container support plate 42.

According to the drive of the second moving mechanism 41, the container support plate 42 is moved by a predetermined distance S3 in the transport direction. Thereby, all storage containers 2 supported by the container support surface 42a of the container support plate 42 are transported in the transport direction by the predetermined distance S3. The path of the storage container 2a at this time is indicated by an arrow r2 (shown in FIG. 11).

In FIG. 11, in a state in which the storage containers 2 has been transported downstream in the transport direction by the container support plate 42, the first hydraulic cylinder 47 is driven to move the piston 47a in the transport direction. As a result, the moving mechanism support plate 45 is lowered by the operation of the link mechanism 46 with the moving mechanism support surface 45a being parallel to the transport direction.

As the moving mechanism support plate 45 is lowered, the second moving mechanism 41 is lowered integrally with the moving mechanism support plate 45. Accordingly, the container support plate 42 supported by the support member 50 of the second moving mechanism 41 is also lowered.

In FIG. 12, when the downward movement of the container support plate 42 causes the height of the container support surface 42a to coincide with the height H2 (shown in FIG. 9) of the container placement surface 7a of the rail section 7, the storage containers 2 that have been supported only by the container support surface 42a of the container support plate 42 are placed on the container placement surface 7a of the rail section 7. The path of the storage container 2a at this time is indicated by an arrow r3.

In FIGS. 6 and 12, the storage containers 2 that have been initially placed on the container placement surface 7a of the rail section 7 are moved in the transport direction by a distance S3 (shown in FIG. 11) while drawing a square pulse-shaped path, and are placed again on the container placement surface 7a of the rail section 7 by the operation of the container support plate 42 based on the drive of the first moving mechanism 40 and the second moving mechanism 41. At this time, the path of the storage container 2a is in the order of the arrow r1, arrow r2, and arrow r3.

In this way, the plurality of storage containers 2 placed on the container placement surface 7a inside the heat treatment furnace apparatus 1 are heated while moving in the transport direction inside the furnace inlet section 10 and heating section 12 of the furnace body 6 by the predetermined distance S3 in each time while drawing a square pulse-shaped path.

The plurality of heated and sintered storage containers 2 then proceed to the cooling section 13 in the transport direction by the predetermined distance S3 in each time while drawing a square pulse-shaped path, and are cooled while moving inside the cooling section 13 in the transport direction.

In FIG. 6, the storage container 2b has been located at the most downstream side in the transport direction before the in-furnace transport operation of the storage containers. In FIG. 12, the storage container 2b is placed onto the downstream end portion of the container placement surface 7a, that is, onto the upstream end portion of the overlapped outlet side transport surfaces 28a of the outlet side chain belt mechanism. In other words, the storage container 2b is placed at the detection position of the second photoelectric sensor.

In a state in which the storage container 2a is supported by the container placement surface 7a and the container support surface 42a, the first hydraulic cylinder 47 is further driven to move the piston 47a in the transport direction, so that the moving mechanism support plate 45 is lowered.

In FIG. 13, by the lowering of the moving mechanism support plate 45, the container support plate 42 is integrally lowered, and the container support surface 42a is lowered below the height of the container placement surface 7a and is positioned at height H1 (shown in FIG. 5). As a result, the container support plate 42 returns to the state before the storage containers 2 are transported, as shown in FIG. 5 and FIG. 6.

In FIG. 6, the storage container 2a has been located at the downstream end portion of the inlet side transport surfaces 20a, which are on the upstream end portion of the container placement surface 7a. In FIG. 13, the storage container 2a is transported in the transport direction by a predetermined distance S3 (shown in FIG. 11). This causes the first photoelectric sensor to transmit a container loading command signal. Furthermore, the following are sequentially performed: operation process of loading the storage container into the heat treatment furnace apparatus 1; and operation process of transporting the storage containers inside the heat treatment furnace apparatus 1.

It is also possible to change the detection settings of the limit switches 53 installed on the individual hydraulic cylinders to change: the vertical movement distance of the storage containers 2 based on the piston stroke of the first hydraulic cylinder 47 of the first moving mechanism 40; and the movement distance S3 in the transport direction of the storage containers 2 based on the piston stroke of the second hydraulic cylinder 51 of the second moving mechanism 41, for each pulse-shaped transport step.

Next, the operation of unloading the storage container from the heat treatment furnace apparatus 1 will be described.

In FIG. 12, when the storage container 2b is placed at the detection position of the second photoelectric sensor, the second photoelectric sensor transmits a container unloading command signal.

In FIG. 13, the outlet side chain belt sections 28 are circulated via the drive section 29 in response to a container unloading command signal from the second photoelectric sensor. Thereby, the storage container 2b placed on the upstream end portion of the outlet side transport surfaces 28a is moved from the upstream end portion of the outlet side transport surfaces 28a (indicated as the storage container 2b shown by dashed lines in FIG. 13) to the downstream end portion thereof (indicated as the storage container 2b shown by solid lines in FIG. 13). At this time, the outlet side lift platform 91 is lowered, and the outlet side lift platform upper surface 91a is at a lower position than the outlet side transport surfaces 28a.

Next, the outlet side lift platform 91 is raised to raise storage container 2 placed on its upstream end portion. At this time, the opening/closing mechanism 66 is open, and the opening/closing mechanism 67 is closed. The pusher 68 moves the storage container 2 into the outlet side unloading mechanism 16. The pusher 68 returns, and the opening/closing mechanism 66 closes. Next, the opening/closing mechanism 67 opens, and the storage container 2 is discharged and transported to the next process.

The operation of the in-furnace container transport unit 8 transports the storage container 2 by the predetermined distance S3 in each time. As a result, the storage container 2 reaches the upstream end portion of the outlet side transport surfaces 28a, which is the detection position of the second photoelectric sensor. At this time, the second photoelectric sensor transmits a signal, and the storage container 2 is unloaded outside the heat treatment furnace apparatus 1. Each time the second photoelectric sensor signal is transmitted, one of the storage containers 2 is unloaded outside the heat treatment furnace apparatus 1 and transported to the next process.

According to this embodiment, in the heating section 12 and cooling section 13 of the furnace body 6, the storage containers 2 each storing a plurality of ceramic metal substrates 3 can be transported in a state in which the storage containers 2 are in a substantially unloaded state while drawing a pulse-shaped path, and the storage containers 2 can be subjected to heating and sintering treatment in the unloaded transport state. Therefore, friction is not generated between the storage containers 2 and the container placement surface 7a of the rail section 7, and wear deformation can be eliminated in the storage containers 2 and the container placement surface 7a of the rail section 7. This eliminates the need to replace worn belts and rail sections that has arisen in conventional heat treatment furnaces, and reduces the equipment cost of the heat treatment furnace apparatus.

Furthermore, according to this embodiment, friction and wear are not generated between the storage containers 2 and the container placement surface 7a of the rail section 7. Therefore, wear powder generated by wear between the storage containers 2 and the rail section 7 does not adhere to the ceramic metal substrates 3. This allows for reducing defects in the ceramic metal substrates 3 caused by the wear powder.

Furthermore, since the storage containers 2 are transported in a substantially unloaded state, no load is applied when a mesh belt is used. For example, as shown in the conventional art of FIG. 15, if stainless steel storage containers 103 measuring 200 mm long×200 mm wide×50 mm high are used in heat treatment of ceramic metal substrates 104, the weight of the storage containers 103 each storing the ceramic metal substrates 104 is approximately 1 kg. If 20 storage containers 103 are moved simultaneously by the drive section 101 while the mesh belt 100 slides on the base 102, a load of 20 kg is applied to the mesh belt.

In contrast, in the heat treatment furnace apparatus 1 of the no-load transport type used in this embodiment, the pressing load on the storage container is substantially zero. In addition, the load on the pusher at the inlet and outlet and the chain belt sections can be reduced to 1 kg.

Therefore, it is possible to provide a heat treatment furnace apparatus 1 that is superior to conventional belt furnaces in terms of equipment cost due to friction and wear, and production efficiency of ceramic metal substrates.

In this embodiment, the in-furnace container transport unit shown in FIGS. 2 and 3 is used as a mechanism for raising and lowering the container support plate 42 and reciprocating it in the transport direction in an in-furnace container transport unit. However, this embodiment is not limited to this.

FIG. 14 is a diagram of an in-furnace container transport unit for a heat treatment furnace apparatus according to a second embodiment.

In an in-furnace container transport unit 80 in FIG. 14, the following have the same configuration as that shown in FIGS. 2 and 3: the container support plate 42 for supporting the storage containers 2; and the second moving mechanism 41 for supporting the container support plate 42 in the vertical direction inside the gap 36.

In FIG. 14, a first moving mechanism 81 in the in-furnace container transport unit 80 has a moving mechanism support surface 82a parallel to the transport direction, and comprises: a moving mechanism support plate 82 movably provided along the base section 8a of the in-furnace container transport unit; and a plurality of protruding portions 84 provided on the base section 8a of the in-furnace container transport unit so as to protrude upward at predetermined intervals in the transport direction. The second moving mechanism 41 also comprises a support member 50 and a plurality of rollers 49 that can freely reciprocate in the transport direction on the moving mechanism support surface 82a of the moving mechanism support plate 82.

In FIG. 14, each protruding portion 84 has an upstream end portion in the transport direction that protrudes almost directly upward. Each protruding portion 84 has a sloped surface 84a that slopes upward from the downstream end portion of the base section 8a toward the protruding portion at the upstream end portion in the transport direction. In other words, the side surface of the protruding portion 84 has a shape of a substantially right-angled triangle.

The first moving mechanism 81 comprises a plurality of rollers 85 that are rotatably connected to the moving mechanism support plate 82 and that reciprocate while rotating on the sloped surfaces 84a of the protruding portions 84 formed on the base section 8a. The moving mechanism support plate 82 is raised and lowered integrally with the rollers 85 in accordance with the reciprocation of the rollers 85 along the sloped surfaces 84a, with the moving mechanism support surface 82a being parallel to the transport direction.

The first moving mechanism 81 comprises a first hydraulic cylinder 87 for reciprocating the moving mechanism support plate 82 parallel to the transport direction by the reciprocation of the piston, and a limit switch for detecting the stroke of the piston.

In this embodiment, the first hydraulic cylinder 87 is driven to move the piston in the opposite direction of the transport direction (upstream direction). As a result, the rollers 85 of the moving mechanism support plate 82 rotate and move in the opposite direction of the transport direction on the sloped surfaces 84a of the protruding portions 84 of the base section 8a. The moving mechanism support plate 82 is raised integrally with the rollers 85 with its moving mechanism support surface 82a parallel to the transport direction.

As the moving mechanism support plate 82 is raised, the second moving mechanism 41 is raised integrally with the moving mechanism support plate 82. As a result, the container support plate 42 (shown in FIG. 13, etc.) supported by the support member 50 of the second moving mechanism 41 is also raised integrally.

Then, with the container support plate 42 and support member 50 raised, the second hydraulic cylinder 51 is operated to move the second moving mechanism 41 in the transport direction. Next, the first hydraulic cylinder 87 is driven to move the piston in the transport direction. As a result, the roller 85 of the moving mechanism support plate 82 rotates and moves in the transport direction on the sloped surfaces 84a of the protruding portions 84 of the base section 8a. The moving mechanism support plate 82 is lowered integrally with the rollers 85 with its moving mechanism support surface 82a parallel to the transport direction.

As the moving mechanism support plate 82 is lowered, the second moving mechanism 41 is lowered integrally with the moving mechanism support plate 82, and the container support plate 42 supported by the support member 50 of the second moving mechanism 41 is also lowered integrally.

In this way, also when the in-furnace container transport unit 80 of this modified example is used, the container support plate 42 can be raised and lowered by the operation of the first moving mechanism 81. This allows for substantially the same operation process as with the in-furnace container transport unit 8 having the first moving mechanism 40.

In FIG. 14, the base section 8a comprises a gas injection port 88. This allows for preventing gas from flowing out of the gap 36 by injecting the same gas as the furnace body 6 into the in-furnace container transport unit 80. This then allows for reducing the gas flow rate injected into the furnace body 6 and widening the gap 36.

In the above, this embodiment has been described with an example in which the heat treatment furnace apparatus is a brazing furnace apparatus that performs heat treatment of the ceramic metal substrates 3 in brazing processing. However, this embodiment is not limited to this. For example, the present embodiment can also be applied to a heat treatment furnace apparatus that performs heat treatment other than brazing.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A heat treatment furnace apparatus that heats, when a metal plate is brazed to a ceramic substrate, at least one storage container made of stainless steel, in which a plurality of ceramic metal substrates are stored, to subject the plurality of ceramic metal substrates to a heat treatment at 600 degrees Celsius or more and less than 950 degrees Celsius, the heat treatment furnace apparatus comprising:

a heater provided outside a heated compartment;

a rail section that transports the storage container placed inside the heated compartment; and a transport device that transports the storage container placed on the rail section in a predetermined transport direction along the rail section while moving the storage container in a direction perpendicular to the rail section, wherein the transport device includes a first moving device for moving the storage container in the transport direction, and a second moving device for integrally moving the storage container and the first moving device in a vertical direction, the first moving device includes a container support plate for supporting the storage container, a support member for supporting the container support plate, and a first moving mechanism for moving the support member in the transport direction, the second moving device includes a support plate for supporting the support member movably along the transport direction, and a second moving mechanism for raising and lowering the support plate, the rail section has a central portion in which a space passing therethrough in a vertical direction is formed along the transport direction, the rail section has an upper space configured as a transport space for the storage container, and the rail section has an upper surface configured as a placement surface for the storage container, the container support plate is supported by the support member in a state in which the container support plate is inserted into the space of the rail section with an upper surface of the container support plate being parallel to a storage container placement surface of the rail section, the rail section includes an inlet side chain belt mechanism such that there are provided an endless circular inlet side chain belt section and a drive section that circulates the inlet side chain belt section, a downstream end portion of a transport surface of the inlet side chain belt section is connected to an upstream end portion of the storage container placement surface of the rail section, and the transport surface of the inlet side chain belt section is disposed along the storage container placement surface, and includes an outlet side chain belt mechanism such that there are provided an endless circular outlet side chain belt section and a drive section that circulates the outlet side chain belt section, an upstream end portion of a transport surface of the outlet side chain belt section is connected to a downstream end portion of the storage container placement surface of the rail section, and the transport surface of the outlet side chain belt section is disposed along the storage container placement surface, the container support plate is configured such that when a height of the upper surface of the container support plate coincides with a height of the storage container placement surface of the rail section, an upstream end portion of the upper surface of the container support plate overlaps a downstream end portion of the transport surface of the inlet side chain belt section, the container support plate is configured such that a downstream end portion of the upper surface of the container support plate overlaps the upstream end portion of the transport surface of the outlet side chain belt section, wherein the inlet side chain belt section and the outlet side chain belt section include a space passing through a central portion in a vertical direction, a mechanism is provided such that the space of the inlet side chain belt section has an inlet side lift platform connected to an inlet side lift cylinder, the mechanism is at a same height as a loading section of an inlet side loading mechanism at a higher position than an upper surface of the inlet side chain belt section, and the storage container is transported from the loading section, and the inlet side lift cylinder is lowered, thereby placing the storage container on the inlet side chain belt section, and a mechanism is provided such that the space of the outlet side chain belt section has an outlet side lift platform connected to an outlet side lift cylinder, the outlet side lift platform, which is at a position lower than an upper surface of the outlet side chain belt section, is raised by the outlet side lift cylinder to the storage container located downstream of the outlet side chain belt section, and thus the outlet side lift platform moves to a same height as a discharge section of an outlet side unloading mechanism, and the storage container is transported to an unloading section.

2. The heat treatment furnace apparatus according to claim 1, wherein the transport device is a device for moving the storage containers so as to draw a square pulse-shaped path while placing the storage containers on the rail section with required intervals between the storage containers.

3. The heat treatment furnace apparatus according to claim 1, wherein the heated compartment has an inert gas atmosphere, and is configure to allow the inert gas to flow into the heated compartment from an outside and to flow out of the heated compartment.

4. The heat treatment furnace apparatus according to claim 1, wherein the second moving mechanism has a link mechanism for raising and lowering the support plate with its support surface parallel to the transport direction, and is configured to reciprocate the support plate parallel to the transport direction to raise and lower the support plate via the link mechanism.

5. The heat treatment furnace apparatus according to claim 1, wherein the second moving mechanism includes a moving mechanism aid plate provided so as to be movable along the transport direction relative to the headed compartment, a plurality of protruding portions each having a sloped surface, the sloped surface being provided at a predetermined interval along the transport direction on a base section of the second moving mechanism, having one end portion on an upstream side protruding upward, and being sloped upward toward the protruding one end from another end portion on a downstream side of the base section, and a plurality of rollers that are rotatably connected to the moving mechanism aid plate, and reciprocate while rotating on the sloped surface of a protruding portion on an upper surface of the base section, and the moving mechanism aid plate is reciprocated in parallel to the transport direction, and thereby the moving mechanism aid plate is raised and lowered integrally with the rollers by reciprocating the rollers along the sloped surface in a state in which the support surface of the moving mechanism aid plate is parallel to the transport direction.

6. The heat treatment furnace apparatus according to claim 1, wherein the heater is installed parallel to an outer side surface of the heated compartment, the heater being installed on an outer side of the heated compartment, and a position of a bottom of the heater is at a same height as that of a bottom of the storage container when the storage container is on the rail section.

7. The heat treatment furnace apparatus according to claim 1, wherein the heat treatment furnace apparatus includes the storage container, and a hole portion is formed on a bottom surface of the storage container so as to include a central portion of the storage container.

* * * * *